United States Patent
Park et al.

(10) Patent No.: US 11,121,428 B2
(45) Date of Patent: Sep. 14, 2021

(54) END PLATE, BATTERY MODULE, BATTERY PACK COMPRISING THE BATTERY MODULE AND VEHICLE COMPRISING THE BATTERY PACK

(71) Applicant: LG Chem, Ltd., Seoul (KR)

(72) Inventors: Jin-Yong Park, Daejeon (KR); Jeong-O Mun, Daejeon (KR); Ho-June Chi, Daejeon (KR)

(73) Assignee: LG Chem, Ltd.

( * ) Notice: Subject to any disclaimer, the term of this patent is extended or adjusted under 35 U.S.C. 154(b) by 35 days.

(21) Appl. No.: 16/344,184

(22) PCT Filed: Apr. 3, 2018

(86) PCT No.: PCT/KR2018/003930
§ 371 (c)(1),
(2) Date: Apr. 23, 2019

(87) PCT Pub. No.: WO2018/186664
PCT Pub. Date: Oct. 11, 2018

(65) Prior Publication Data
US 2019/0267591 A1    Aug. 29, 2019

(30) Foreign Application Priority Data
Apr. 6, 2017    (KR) .................. 10-2017-0044946

(51) Int. Cl.
*H01M 50/20*    (2021.01)
*B60L 50/64*    (2019.01)
*B60K 6/28*    (2007.10)

(52) U.S. Cl.
CPC .............. *H01M 50/20* (2021.01); *B60K 6/28* (2013.01); *B60L 50/64* (2019.02);
(Continued)

(58) Field of Classification Search
CPC combination set(s) only.
See application file for complete search history.

(56) References Cited

U.S. PATENT DOCUMENTS

| 8,465,866 | B2 | 6/2013 | Kim |
| 8,999,557 | B2 | 4/2015 | Kim |

(Continued)

FOREIGN PATENT DOCUMENTS

| CN | 102651462 A | 8/2012 |
| CN | 105742539 A | 7/2016 |

(Continued)

OTHER PUBLICATIONS

Choi, English translation of KR101979888, "Battery Module Battery Pack Comprising the Battery Module and Vehicle Comprising the Battery Pack,".*

(Continued)

*Primary Examiner* — Ula C Ruddock
*Assistant Examiner* — Sarika Gupta
(74) *Attorney, Agent, or Firm* — Lerner, David, Littenberg, Krumholz & Mentlik, LLP

(57) ABSTRACT

A battery module according to an embodiment of the present disclosure includes a cell assembly including a plurality of battery cells stacked side by side in a horizontal direction, each battery cell defining a respective plane extending in a vertical direction perpendicular to the horizontal direction, and an end plate having a support part configured to support a bottom of the cell assembly, an outer side part extending in the vertical direction from an end of the support part, and an inner side part extending downward and inward from a top of the outer side part.

9 Claims, 13 Drawing Sheets

(52) U.S. Cl.
CPC ....... *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

| | | | |
|---|---|---|---|
| 9,761,849 | B2 | 9/2017 | Lim et al. |
| 10,205,143 | B2 | 2/2019 | Ha et al. |
| 2012/0214046 | A1 | 8/2012 | Lim |
| 2016/0133892 | A1 | 5/2016 | Uhm et al. |
| 2016/0308242 | A1* | 10/2016 | Ju .................. H01M 50/20 |
| 2017/0062783 | A1 | 3/2017 | Kim et al. |
| 2017/0309877 | A1 | 10/2017 | Wu et al. |
| 2018/0138474 | A1 | 5/2018 | Choi et al. |

FOREIGN PATENT DOCUMENTS

| | | | |
|---|---|---|---|
| EP | 3288098 | A1 | 2/2018 |
| JP | 2012243534 | A | 12/2012 |
| JP | 2015232922 | A | 12/2015 |
| JP | 2016091991 | A | 5/2016 |
| JP | 2017027673 | A | 2/2017 |
| JP | 2018107078 | A | 7/2018 |
| KR | 20110117585 | A | 10/2011 |
| KR | 101097229 | B1 | 12/2011 |
| KR | 20120055770 | A | 6/2012 |
| KR | 20150012413 | A | 2/2015 |
| KR | 20150142790 | A | 12/2015 |
| KR | 20160133245 | A | 11/2016 |
| KR | 20160135538 | A | 11/2016 |
| KR | 20170022119 | A | 3/2017 |
| KR | 20170025491 | A | 3/2017 |
| WO | 2014050109 | A1 | 4/2014 |
| WO | 2017030290 | A1 | 2/2017 |

OTHER PUBLICATIONS

International Search Report for PCT/KR2018/003930 dated Aug. 7, 2018.
Extended European Search Report including Written Opinion for Application No. 18781867.9 dated May 27, 2020, 14 pgs.
Search Report from Office Action for Chinese Applicatiion No. 201880005375.3 dated Jul. 5, 2021; 3 pages.

* cited by examiner

END PLATE, BATTERY MODULE, BATTERY PACK COMPRISING THE BATTERY MODULE AND VEHICLE COMPRISING THE BATTERY PACK

TECHNICAL FIELD

The present application is a national phase entry under 35 U.S.C. § 371 of International Patent Application No. PCT/KR2018/003930, filed on Apr. 3, 2018, published in Korean, which claims priority from Korean Patent Application No. 10-2017-0044946, filed on Apr. 6, 2017, the disclosures of which are hereby incorporated herein by reference.

The present disclosure relates to an end plate, a battery module, a battery pack comprising the battery module and a vehicle comprising the battery pack, and more particularly, to an end plate for preventing the shape changes of a battery module caused by swelling phenomena, a battery module, a battery pack comprising the battery module and a vehicle comprising the battery pack.

BACKGROUND ART

Due to its characteristics of being easily applicable to various products and electrical characteristics such as high energy density, a secondary battery is not only commonly applied to a portable device, but universally applied to an electric vehicle (EV) or a hybrid electric vehicle (HEV) that is driven by an electrical driving source. This secondary battery is gaining attention for its primary advantage of remarkably reducing the use of fossil fuels and not generating by-products from the use of energy, making it a new eco-friendly and energy efficient source of energy.

Currently, widely used secondary batteries include lithium ion batteries, lithium polymer batteries, nickel-cadmium batteries, nickel-hydrogen batteries, nickel-zinc batteries, and the like. The operating voltage of a unit secondary battery cell, i.e., a unit battery cell is about 2.5V~4.2V. Accordingly, when higher output voltage is required, a plurality of battery cells may be connected in series to construct a battery pack. Additionally, according to the charge/discharge capacity required for the battery pack, a plurality of battery cells may be connected in parallel to construct a battery pack. Accordingly, the number of battery cells included in the battery pack may be variously set according to the required output voltage or charge/discharge capacity.

Meanwhile, when constructing a battery pack by connecting a plurality of battery cells in series/in parallel, it is general to construct a battery pack by manufacturing a battery module including a cell assembly composed of two or more battery cells first, and then add other components to a plurality of battery modules to construct a battery pack.

Meanwhile, in the case of the cell assembly composed of a plurality of battery cells in the battery module, the battery cell may be a pouch-type secondary battery cell. In the case of the pouch-type secondary battery, gas may be generated as a result of decomposition of an electrolyte solution therein due to side reactions caused by repeated charging/discharging, resulting in cell expansion. In this instance, a phenomenon in which the shape of the battery cell is deformed by the generated gas is referred to as a swelling phenomenon.

Accordingly, a method of inserting a buffer between battery cells was applied to a certain conventional battery module to prevent swelling phenomena.

FIG. 1 is a diagram of the conventional battery module with buffer inserted between battery cells.

Referring to FIG. 1, the conventional battery module has the buffer 2 of a soft elastic material such as Ethylene Propylene Diene Monomer (EPDM) rubber or polyurethane foam inserted between the battery cells 1 to control swelling phenomena in the battery cell.

However, when the buffer 2 is inserted between the battery cells 1 to control swelling, because the soft element is applied, it is difficult to apply the initial pressure to the battery cell 1, and according to the properties of the soft material, the element may wear over time, and as a consequence, may be vulnerable to deformation, causing a subsequent swelling control problem and product reliability degradation.

Meanwhile, besides the above-described method of inserting the buffer between the battery cells, a method of installing a high rigidity end plate at the periphery of the battery cell may be applied to the conventional battery module to prevent swelling phenomena.

FIG. 2 is a diagram of the conventional battery module with high rigidity end plate installed around battery cells.

Referring to FIG. 2, the conventional battery module has the pressing type end plate 3 with high rigidity installed around the battery cells 1 to control swelling phenomena in the battery cell 1.

However, when the end plate 3 is installed around the battery cells 1 to control swelling, the battery module withstands the swelling pressure by the pressing type end plate 3 alone without a structure for absorbing swelling between the battery cells 1, and thus, the pressing type end plate 3 should be manufactured using a high tension steel plate made of thick metal. Accordingly, in the manufacture of the battery module, the manufacturing costs increase and the volume and weight of the battery module increases. Additionally, in case that swelling phenomena is prevented by the pressing type end plate 3 alone, it is difficult to control a thickness allowance of the unit battery cell when constructing a cell assembly composed of the plurality of battery cells 1.

DISCLOSURE

Technical Problem

The present disclosure is directed to providing an end plate for preventing the shape changes of a battery module caused by swelling phenomena, a battery module, a battery pack comprising the battery module and a vehicle comprising the battery pack.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

To achieve the above-described technical object, a battery module according to the present disclosure includes a cell assembly including a plurality of battery cells stacked side by side in a horizontal direction, each battery cell standing defining a respective plane extending in a vertical direction perpendicular to the horizontal direction, and an end plate having a support part configured to support a bottom of the cell assembly, an outer side part extending in the vertical direction from an end of the support part, and an inner side part extending downward and inward from a top of the outer side part.

The inner side part may include a stop protrusion part at a bottom of the inner side part.

The support part may include a guide groove part into which the stop protrusion part of the inner side part extends, the guide groove part being configured to limit movement of the inner side part in the horizontal direction.

The end plate may include a second outer side part extending in the vertical direction from another end of the support part, and a second inner side part extending downward and inward from a top of the second outer side part, and a distance between a bottom of the first inner side part and a bottom of the second inner side part may be less than a width of the cell assembly in the horizontal direction.

A distance between a top of the first inner side part and a top of the second inner side part may be equal to or larger than a width of the cell assembly in the horizontal direction.

The support part, the outer side part and the inner side part may be integrally formed.

The inner side part may extend from the top of the outer side part at an acute angle.

The inner side part may include a protruding part that extends in the horizontal direction toward the outer side part, the protruding part being configured to limit the movement of the inner side part to a preset distance in the horizontal direction.

An end plate according to the present disclosure includes a support part configured to support a bottom of a cell assembly including a plurality of battery cells stacked side by side in a horizontal direction, each battery cell defining a respective plane extending in a vertical direction perpendicular to the horizontal direction, an outer side part extending in the vertical direction from an end of the support part, and an inner side part extending downward and inward from a top of the outer side part.

A battery pack according to the present disclosure includes the battery module and a pack case configured to receive the battery module therein.

A vehicle according to the present disclosure includes the battery pack.

Advantageous Effects

According to the present disclosure, it is possible to prevent the shape changes of the battery module caused by swelling phenomena.

More specifically, the end plate according to the present disclosure is formed by bending a sheet and thus has the reduced volume and weight, thereby reducing the volume of the battery module and increasing the energy density.

MODE FOR CARRYING OUT THE INVENTION

Figure 1:
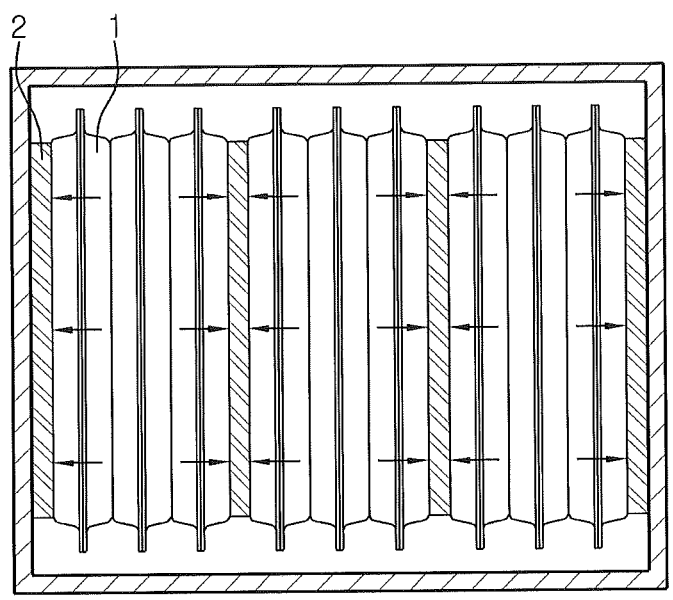
FIG. 1 is a diagram of a conventional battery module with a buffer inserted between battery cells.
Figure 2:
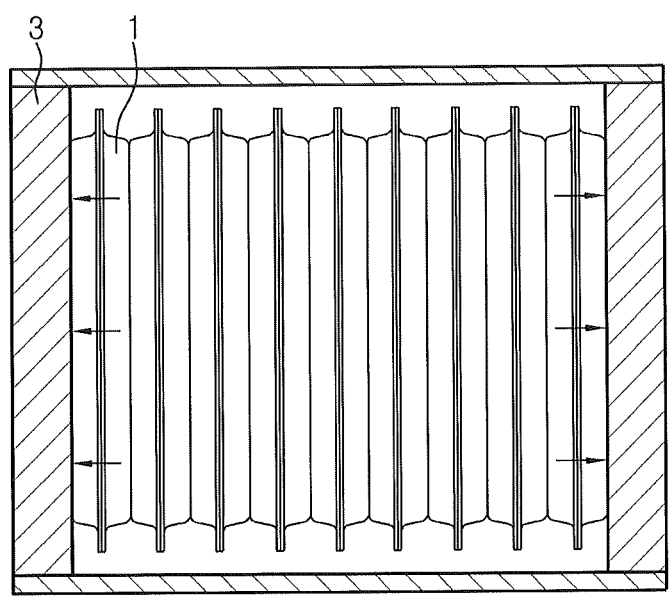
FIG. 2 is a diagram of a conventional battery module with a high rigidity end plate around battery cells.

The above-described object, feature and advantage will be described in detail with reference to the accompanying drawings, and accordingly, those skilled in the art will easily practice the technical aspects of the present disclosure. In describing the present disclosure, when it is deemed that a certain detailed description of relevant known technology unnecessarily renders the key subject matter of the present disclosure ambiguous, the detailed description is omitted herein. Hereinafter, the preferred embodiments of the present disclosure will be described in detail with reference to the accompanying drawings. In the drawings, like reference numerals are used to indicate identical or similar elements.

Figure 3:
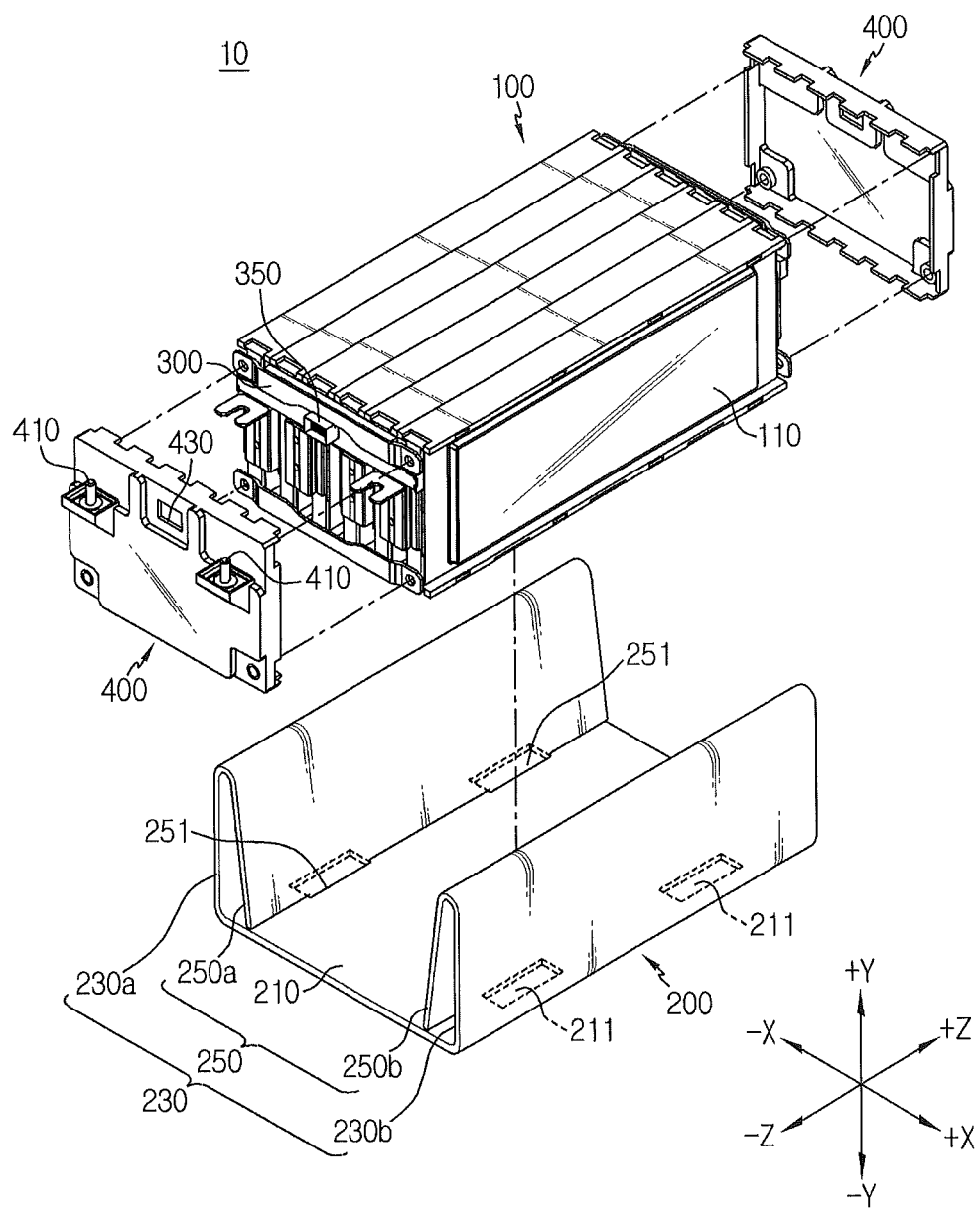
FIG. 3 is an exploded perspective view of a battery module according to an embodiment of the present disclosure.
Figure 4:
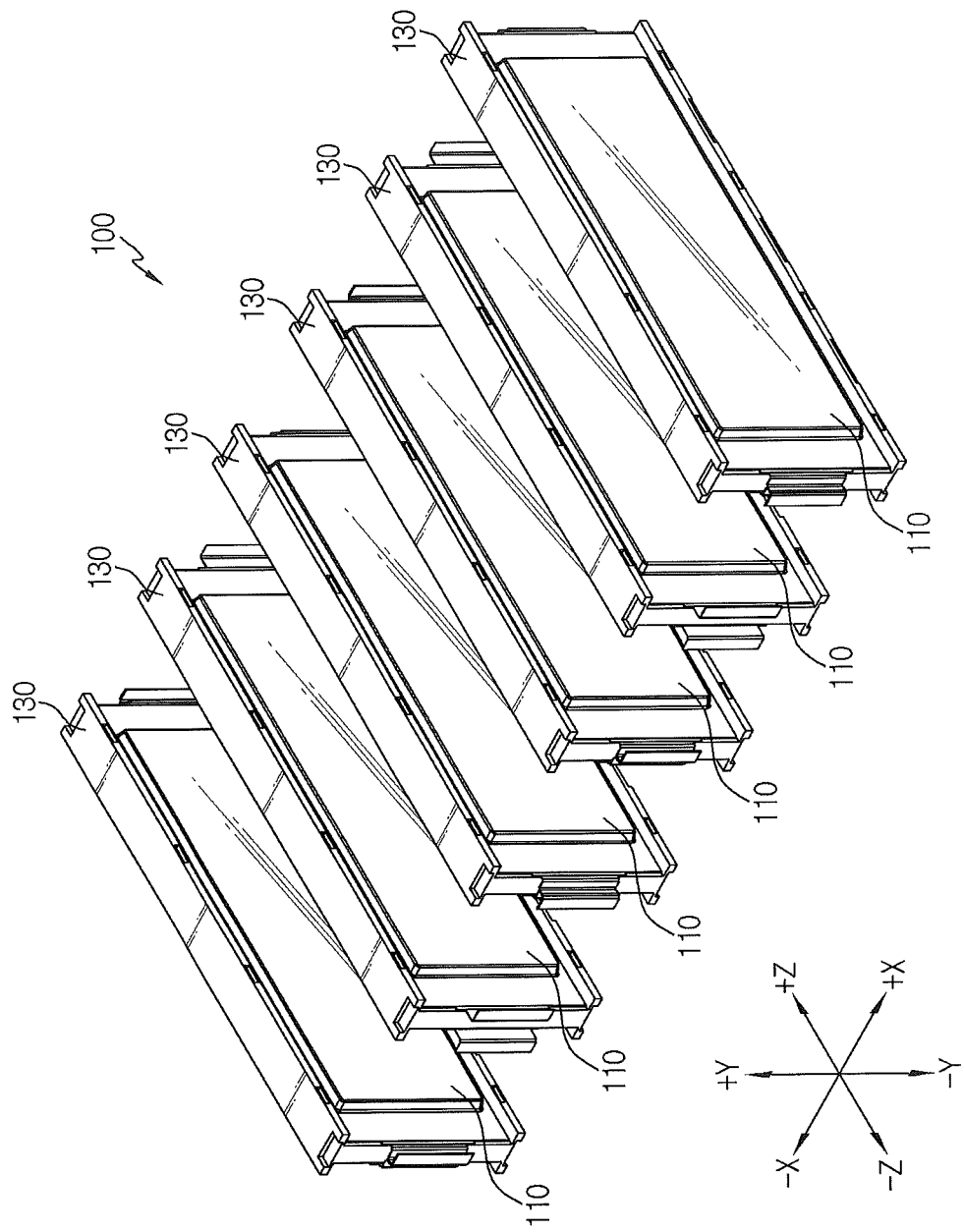
FIG. 4 is an exploded perspective view of a cell assembly included in a battery module according to an embodiment of the present disclosure.
Figure 5:
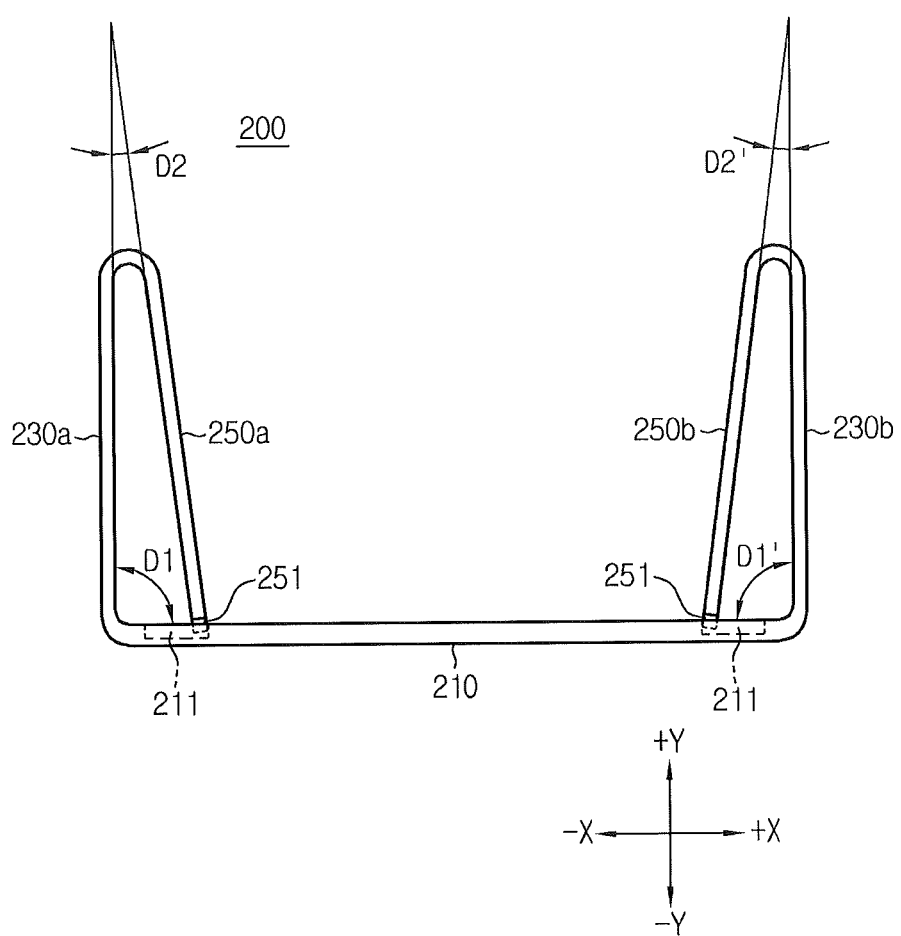
FIG. 5 is a front view of an end plate according to an embodiment of the present disclosure.

FIG. 3 is an exploded perspective view of a battery module according to an embodiment of the present disclosure, FIG. 4 is an exploded perspective view of a cell assembly included in the battery module according to an embodiment of the present disclosure, and FIG. 5 is a front view of an end plate according to an embodiment of the present disclosure.

Referring to FIGS. 3 to 5, the battery module 10 according to an embodiment of the present disclosure may include a cell assembly 100 and an end plate 200.

The cell assembly 100 may include a battery cell 110.

A plurality of battery cells 110 may be provided, and each battery cell 110 may be configured such that it stands erect in up-down direction ($\pm Y$ axis direction). In addition, the plurality of battery cells may be stacked side by side in horizontal direction, for example, left-right direction ($\pm X$ axis direction). Each battery cell 110 may include an electrode assembly, a battery case to receive the electrode assembly, and an electrode lead 115. Here, the electrode lead may include a positive electrode lead and a negative electrode lead, and the positive electrode lead may be connected to a positive electrode plate of the electrode assembly, and the negative electrode lead may be connected to a negative electrode plate of the electrode assembly.

The battery cell 110 is not limited to a particular type, and various types of secondary batteries may be used in the cell assembly 100 of the battery module 10 according to the present disclosure. For example, the battery cell 110 may include lithium ion batteries, lithium polymer batteries, nickel cadmium batteries, nickel hydrogen batteries and nickel zinc batteries. Particularly, the battery cell 110 may be a lithium secondary battery.

Meanwhile, the battery cell 110 may be classified into pouch type, cylindrical and prismatic according to the type of case. Particularly, the battery cell 110 of the battery module 10 according to the present disclosure may be a pouch-type secondary battery.

When the battery cell 110 is a pouch type secondary battery, as shown in FIGS. 3 and 4, the plurality of battery cells 110 may be arranged in left-right direction (±X axis direction). In addition, each battery cell 110 has wide surfaces positioned on the left and right sides, so that the wide surfaces may face each other. Additionally, in this case, the electrode lead of each battery cell 110 may protrude in front-back direction (±Z axis direction).

Meanwhile, the cell assembly 100 of the battery module 10 according to the present disclosure may further include a cell cartridge 130 and a cooling fin 150.

The cell cartridge 130 is designed to make it easy to stack the plurality of battery cells 110, and may receive at least one of the plurality of battery cells 110. A plurality of cell cartridges 130 may be provided, and in an embodiment of the present disclosure, each cell cartridge 130 may be configured to receive two battery cells 110. However, the cell cartridge 130 is not limited thereto, and may have a structure for receiving each one battery cell therein and a structure for receiving three or more battery cells therein.

The plurality of cell cartridges 130 may hold the plurality of battery cells 110 to prevent them from moving, and may be stacked to guide the assembly of the battery cells 110.

The cooling fin 150 may be made of a thermally conductive material such as aluminum, and may be provided in each cell cartridge 130 for heat exchange with the battery cell 110. The cooling fin 150 provided in each cell cartridge 130 may be inserted into the cell cartridge 130 or may be insert molded.

The end plate 200 may serve to support the outer periphery of the cell assembly 100, and prevent the shape changes caused by swelling phenomena of the cell assembly 100. Here, the outer periphery of the cell assembly 100 supported from the end plate 200 may be the low part of the cell assembly 100 and the side of the outermost battery cell 110 among the plurality of battery cells 110, for example, the left side of the leftmost battery cell and the right side of the rightmost battery cell.

To this end, the end plate 200 may include a support part 210, an outer side part 230 and an inner side part 250.

The support part 210 may serve to support the bottom of the cell assembly 100. Preferably, the support part 210 may be made of a high rigidity metal material, and may be formed in the shape of a plate such that wide surfaces lie as upper and lower surfaces.

Additionally, the support part 210 may have a guide groove part 211, into which the stop protrusion part 251 that protrudes from the bottom of the inner side part 250 is inserted, on the upper surface facing the bottom of the cell assembly 100 to guide or limit the movement of the stop protrusion part 251.

The guide groove part 211 will be described in detail below.

The outer side part 230 may play a role in supporting the inner side part 250 to limit the deformation of the inner side part 250 having an elastic property. To this end, the outer side part 230 may be bent in upward direction (+Y axis direction) from each of one end and the other end of the support part 210.

That is, the outer side part 230 may include a first outer side part 230a that is bent in upward direction (+Y axis direction) from one end (the left end in FIG. 5) of the support part 210, and a second outer side part 230b that is bent in upward direction (+Y axis direction) from the other end (the right end in FIG. 5) of the support part 210. Preferably, an angle D1 formed by the outer side part 230 and the support part may be a right angle.

Preferably, the outer side part 230 is made of high rigidity metal to maintain the shape of the battery module 10 when the inner side part 250 is deformed by the increased volume of the battery cell 110 due to swelling.

Additionally, the outer side part 230 may be formed in the shape of a plate, similar to the support part 210. However, as opposed to the support part 210, the outer side part 230 may stand erect in up-down direction with the wide surfaces positioned in left-right direction.

The inner side part 250 may be positioned on the side of the outermost battery cell 110 of the plurality of battery cells 110 included in the cell assembly 100 to limit the deformation of the cell assembly 100 caused by swelling through elasticity. To this end, the inner side part 250 may be bent down in inward direction from the top of the outer side part 230. Here, the inward direction may refer to a horizontal direction facing the cell assembly 100.

More specifically, referring to the configuration of FIG. 5, the inner side part 250 may include a first inner side part 250a and a second inner side part 250b. Here, the first inner side part 250a may be bent in inward direction (+X axis direction) from the top of the first outer side part 230a and may be bent again in downward direction (−Y axis direction). In addition, the second inner side part 250b may be bent in inward direction (−X axis direction) from the top of the second outer side part 230b and may be bent again in downward direction (−Y axis direction).

Additionally, the inner side part 250 may be formed in the shape of a plate, similar to the support part 210 and the outer side part 230. Further, the inner side part 250 may stand erect in up-down direction with the wide surfaces positioned in left-right direction, similar to the outer side part 230.

Preferably, an angle formed by the inner side part 250 and the outer side part 230 may be an acute angle.

For example, referring to the configuration shown in FIG. 5, when an angle formed by the first outer side part 230a and the first inner side part 250a is D2, D2 may be larger than 0° and smaller than 90°. Additionally, in the configuration of FIG. 5, when an angle formed by the second outer side part 230b and the second inner side part 250b is D2', D2' may be larger than 0° and smaller than 90°. Particularly, D2 and D2' may be smaller than 45°. Further, D2 and D2' may be smaller than 30°, and at the lowest, may be smaller than 15°. Here, D2 and D2' may be equal.

According to this configuration of the present disclosure, the inner side part 250 may support the side of the cell assembly 100. Further, in this case, the inner side part 250 and the outer side part 230 are positioned on the left side and right side of the cell assembly 100, thereby safely protecting the cell assembly 100 from external mechanical impacts or chemical factors.

Particularly, because the inner side part 250 is bent at an acute angle from the outer side part 230, the inner side part 250 may possess an elastic property to the pressure applied in outward direction from the cell assembly 100. Accordingly, when swelling occurs in the battery cell 110 provided in the cell assembly 100 and the pressure is applied to the inner side part 250 in outward direction, the inner side part 250 may support the cell assembly 100 by elasticity in the opposite direction to the direction in which the pressure is applied, i.e., inward direction. Accordingly, it is possible to prevent the cell assembly 100 from expanding too much while properly absorbing the swelling of the battery cell 110.

Moreover, because the battery module 10 according to the present disclosure has the outer side part 230 outside of the inner side part 250, even though the inner side part 250 is slightly deformed by swelling of the battery cell 110, the battery module may have little or no change in the entire shape by the outer side part 230.

Meanwhile, the cell assembly 100 may be inserted and seated inside the inner side part 250, that is to say, between the first inner side part and the second inner side part, and in this case, the inner side part 250 may be a material with elasticity. Accordingly, when the cell assembly 100 is inserted inside the inner side part 250, elasticity of the inner side part 250 may be applied to the cell assembly 100, and the cell assembly 100 may be supported.

Meanwhile, a stop protrusion part 251 may be formed in a protruding manner on the bottom of the inner side part 250. As the stop protrusion part 251 is inserted into the above-described guide grove part 211, its movement may be guided or limited, and through this, the movement of the inner side part 250 may be guided or limited. To this end, the stop protrusion part 251 and the guide grove part 211 may be respectively formed at corresponding locations on the bottom of the inner side part 250 and the upper surface of the support part 210.

Meanwhile, the support part 210, the outer side part 230 and the inner side part 250 as described above may be integrally formed. That is, the support part 210, the outer side part 230 and the inner side part 250 may be formed by bending a sheet.

Accordingly, the battery module is manufactured simply by bending a sheet to form a structure of a hollow structure that supports the sides and the bottom of the cell assembly 100, without the conventional process of extruding side walls that support the sides of a cell assembly, and joining a sheet that supports the bottom of the cell assembly with the extruded side walls.

Hereinafter, assembly of the end plate 200 and the cell assembly 100 will be described in detail.

Figure 6:
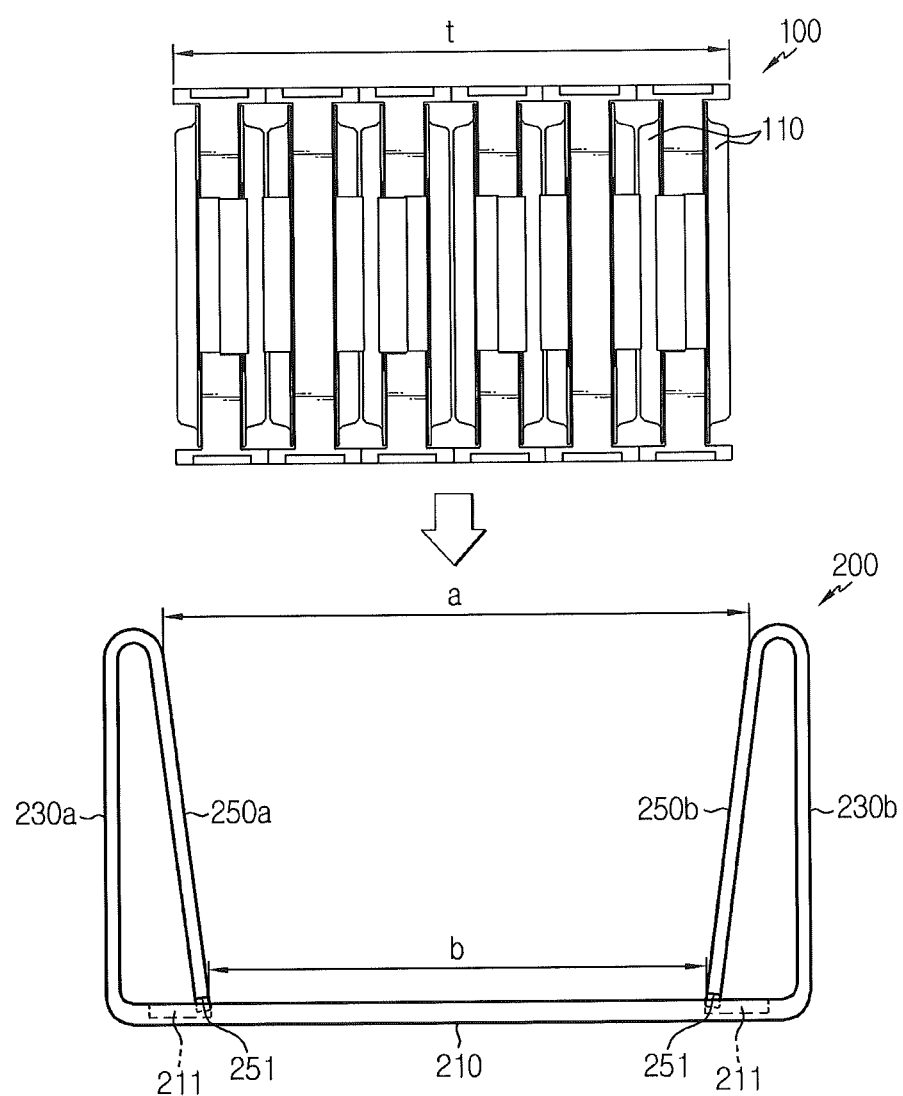
FIG. 6 is a cross-sectional view of an end plate according to an embodiment of the present disclosure and a cell assembly in unassembled state.
Figure 7:
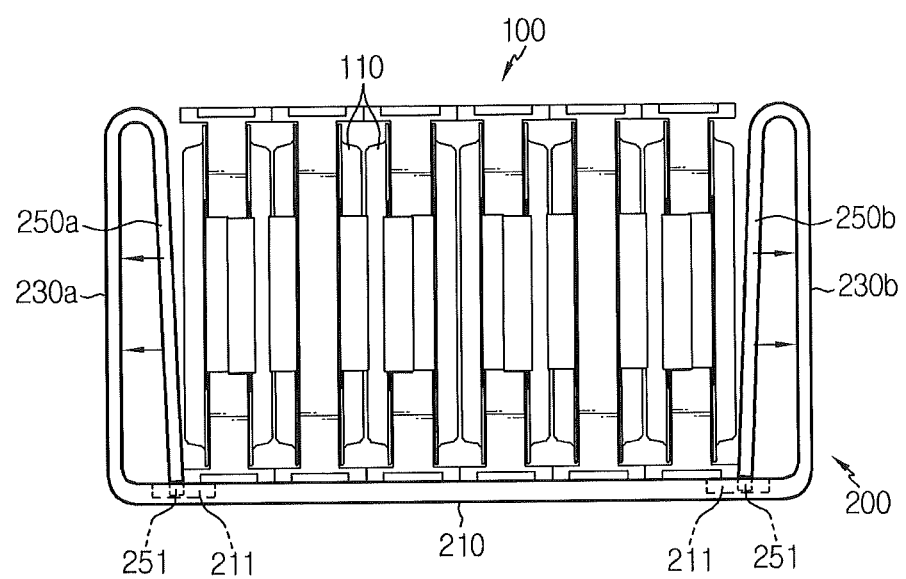
FIG. 7 is a cross-sectional view of an end plate according to an embodiment of the present disclosure and a cell assembly in assembled state.

FIG. 6 is a cross-sectional view of the end plate according to an embodiment of the present disclosure and the cell assembly in unassembled state, and FIG. 7 is a cross-sectional view of the end plate according to an embodiment of the present disclosure and the cell assembly in assembled state.

Referring to FIGS. 6 and 7, the bottom of the cell assembly 100 goes between the top of the first inner side part 250a and the top of the second inner side part 250b, and the cell assembly 100 may be fitted into the end plate 200. To this end, the distance between the top of the first inner side part 250a and the top of the second inner side part 250b may be equal to or larger than the distance t between the sides of the cell assembly 100. Here, the distance t between the sides of the cell assembly 100 is the width of the cell assembly 100 measured on the basis of the horizontal direction in which the battery cells 110 are stacked, and may be a distance from the left side of the leftmost battery cell 110 to the right side of the rightmost battery cell 110.

As described above, the first inner side part 250a and the second inner side part 250b may be respectively bent down inwards at the top of the first outer side part 230a and the second outer side part 230b. In this instance, an angle formed by the first inner side part 250a and the first outer side part 230a and an angle formed by the second inner side part 250b and the second outer side part 230b may be an acute angle. Accordingly, the first inner side part 250a and the second inner side part 250b is not completely parallel to the first outer side part 230a and the second outer side part 230b, and may be slightly inclined in inward direction from the first outer side part 230a and the second outer side part 230b.

Accordingly, before the cell assembly 100 is completely inserted and fitted into the end plate 200, the distance b between the bottom of the first inner side part 250a and the bottom of the second inner side part 250b may be less than the distance t between the sides of the cell assembly 100.

Subsequently, the bottom of the cell assembly 100 goes down to the bottom of the first inner side part 250a and the bottom of the second inner side part 250b, and coupling of the end plate 200 and the cell assembly 100 may be completed.

While the bottom of the cell assembly 100 goes down to the bottom of the first inner side part 250a and the bottom of the second inner side part 250b, the first inner side part 250a and the second inner side part 250b may move to the first outer side part 230a and the second outer side part 230b, respectively.

In this instance, the stop protrusion part 251 on the bottom of the first inner side part 250a and the second inner side part 250b is inserted into the guide grove part 211 and moves along the guide grove part 211 to guide the movement of the first inner side part 250a and the second outer side part 250b.

Meanwhile, elasticity increasing as much as the movement of the first inner side part 250a and the second inner side part 250b presses the sides of the cell assembly 100 to fix and support the cell assembly 100.

Hereinafter, the role of the first and second inner side parts 250a, 250b will be described in preventing the swelling of the end plate 200 when a swelling phenomenon occurs in the cell assembly 100 and the volume of the battery cell 110 increases.

Figure 8:
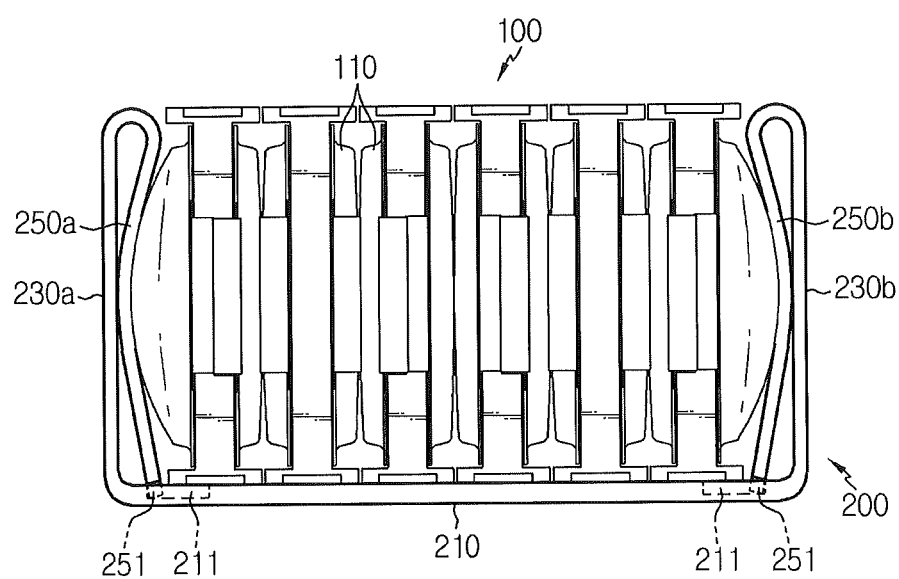
FIG. 8 is a cross-sectional view of an end plate according to an embodiment of the present disclosure and a swollen cell assembly in assembled state.

FIG. 8 is a cross-sectional view of the end plate according to an embodiment of the present disclosure and the swollen cell assembly in assembled state.

Referring to FIG. 8, when a swelling phenomenon occurs in at least one of the plurality of battery cells 110 included in the cell assembly 100 coupled with the end plate 200, the volume of the cell assembly 100 may increase in horizontal direction in which the plurality of battery cells 110 is stacked.

Accordingly, the pressure may be applied to the first inner side part 250a and the second inner side part 250b that support the outermost battery cells 110 of the plurality of battery cells 110 on the sides in the direction in which the volume of the battery cell 110 increases.

Subsequently, the first inner side part 250a and the second inner side part 250b may be respectively guided and moved to the first outer side part 230a and the second outer side part 230b by the guide groove part 211 into which the stop protrusion part 251 is inserted.

More specifically, as a swelling phenomenon occurs in the cell assembly 100, the stop protrusion part 251 is stuck into the end of the guide grove part 211 at the bottom of the first inner side part 250a and the second inner side part 250b, thereby preventing the push to the first outer side part 230a and the second outer side part 230b.

Through this, the bottom of the first inner side part 250a and the second inner side part 250b may maintain a predetermined distance from the first outer side part 230a and the second outer side part 230b respectively, thereby increasing elasticity applied to the central part and the top of the first inner side part 250a and the second side surface part 250b.

In contrast, when the volume of the cell assembly 100 continuously increases, in response to the pressure being continuously applied, the central part of the first inner side part 250a and the second inner side part 250b contacting with the central part of the battery cell 110 may bend much more toward the first outer side part 230a and the second outer side part 230b. When the volume of the battery cell 110 continuously increases, the central part of the first inner side part 250a and the second inner side part 250b may come into contact with the central part of the first outer side part 230a and the second outer side part 230b, respectively. Subsequently, even though the pressure is applied to the first inner side part 250a and the second inner side part 250b, the first outer side part 230a and the second outer side part 230b with high rigidity may support the first inner side part 250a and the second inner side part 250b so that the first inner side part 250a and the second inner side part 250b are no longer deformed.

That is, when a swelling phenomenon occurs in the cell assembly 100, the stop protrusion part 251 is stuck into the end of the guide grove part 211, preventing the bottom of the first inner side part 250a and the second inner side part 250b from moving any longer, and maintaining a predetermined distance from the bottom of the first outer side part 230a and the second outer side part 230b respectively.

In contrast, the central part of the first inner side part 250a and the second inner side part 250b may be bent to the central part of the first outer side part 230a and the second outer side part 230b.

Through this, even though a swelling phenomenon occurs in the cell assembly 100 coupled inside, the end plate 200 according to the present disclosure may maintain the shape through the support part 210 and the outer side part 230 with high rigidity, and prevent the shape changes of the cell assembly 100 through the inner side part 250 with elasticity.

Additionally, because the end plate 200 according to the present disclosure is formed by bending a sheet, the total weight of the battery module 10 reduces, which prevents increases in manufacturing costs, leading to significant improvement in the manufacturing efficiency.

Additionally, the battery module 10 according to the present disclosure may further include a terminal frame 300 and a cover frame 400 as shown in FIG. 3.

The terminal frame 300 is provided on the front side and the rear side of the cell assembly 100, and may be electrically connected to the electrode leads of the plurality of battery cells 110 of the cell assembly 100. For example, the electrode leads of the battery cell 110 may be positioned on the Z axis direction side in the cell assembly 100. That is, the electrode leads of the battery cell 110 may be positioned on the front side and the rear side of the cell assembly 100. In this case, the terminal frame 300 may be provided on the front side and the rear side of the cell assembly 100, and may be connected to the electrode leads of each battery cell 110.

The terminal frame 300 may further include a connector 350.

The connector 350 may serve as a terminal that is electrically connected to a controller included in a battery pack such as a Battery Management System (BMS) outside of the battery module 10.

The cover frame 400 is configured to support the cell assembly 100, and a pair of cover frames 400 is provided on two sides where the electrode leads of the plurality of battery cells 110 of the cell assembly 100 are provided, for example, the front side and the rear side of the battery module 10, covering the front side and the rear side of the cell assembly 100.

At least one of the pair of cover frames 400 may include a terminal 410 and a connector passing part 430.

The terminal 410 may be electrically connected to the terminal frame 300 to establish an electrical connection to the electrode leads of the plurality of battery cells 110. A pair of terminals 410 may be provided and electrically connected to an external power source.

The connector passing part 430 may be formed in the cover frame 400 to allow the connector 350 to pass through the cover frame 400. Accordingly, the connector 350 may be electrically connected to the controller included in the battery pack such as a BMS.

Hereinafter, an end plate according to another embodiment of the present disclosure will be described.

Figure 9:
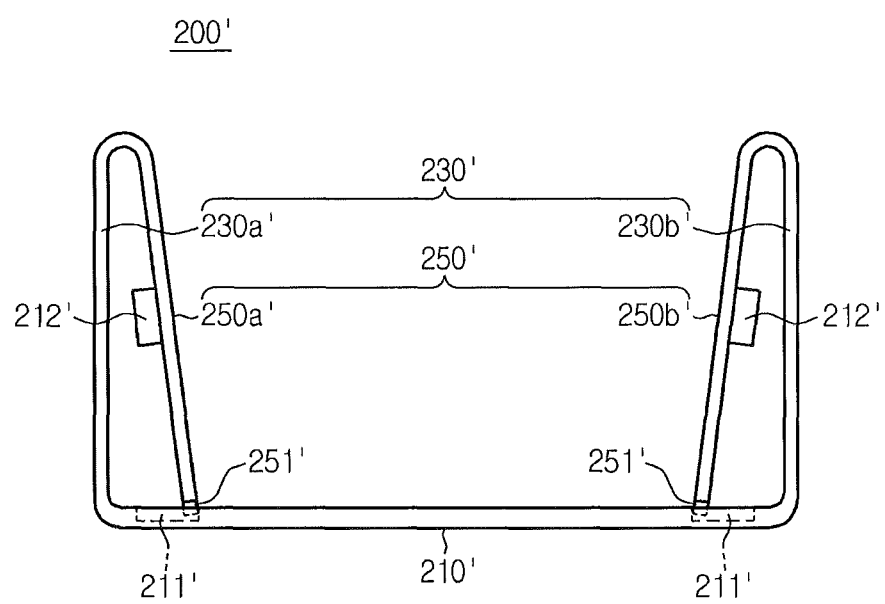
FIG. 9 is a front view of an end plate according to another embodiment of the present disclosure.
Figure 10:
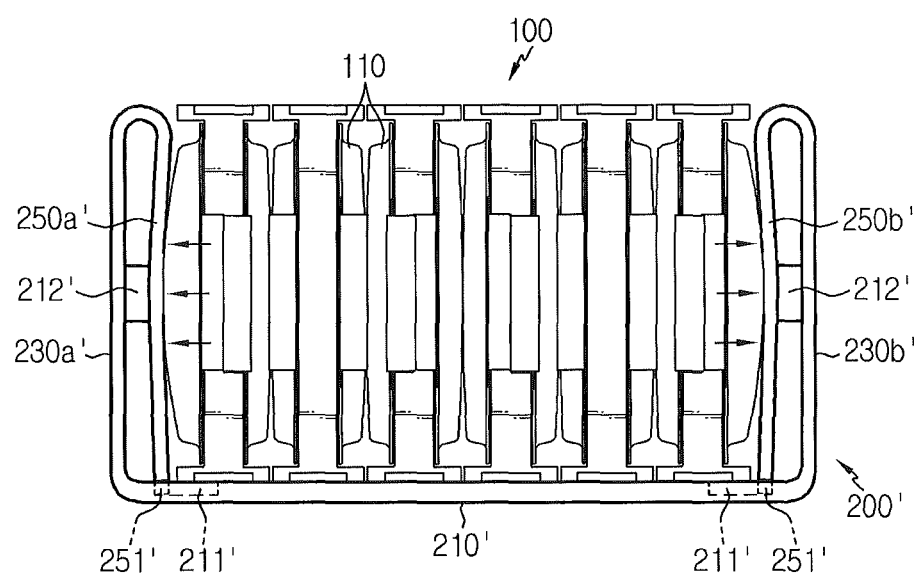
FIG. 10 is a cross-sectional view of an end plate according to another embodiment of the present disclosure and a swollen cell assembly in assembled state.

FIG. 9 is a front view of the end plate according to another embodiment of the present disclosure, and FIG. 10 is a cross-sectional view of the end plate according to another embodiment of the present disclosure and the swollen cell assembly in assembled state.

Referring to FIGS. 9 and 10, the end plate 200' according to another embodiment of the present disclosure is substantially identical or similar to the above-described end plate 200 according to an embodiment of the present disclosure, and thus the identical or similar elements are not repeatedly described and difference(s) will be described.

The end plate 200' according to another embodiment of the present disclosure may include a support part 210' having a guide groove part 211' formed on the upper surface, an outer side part 230' including a first outer side part 230a' and a second outer side part 230b', and an inner side part 250' including a first inner side part 250a' and a second inner side part 250b' having a stop protrusion part 251' on the bottom.

The support part 210' and the outer side part 230' of the end plate 200' according to another embodiment of the present disclosure may have the same shape and role as the support part 210 and the outer side part 230 of the end plate 200 according to an embodiment of the present disclosure.

However, the inner side part 250' of the end plate 200' according to another embodiment of the present disclosure may further have additional element(s) compared to the inner side part 250 of the end plate 200 according to an embodiment of the present disclosure.

More specifically, the inner side part 250' of the end plate 200' according to another embodiment may further have a protruding part 212'. The protruding part 212'protrudes toward the outer side part 230' to limit the distance from the outer side part 250' to a preset distance.

Here, the preset distance may be a preset minimum distance between the inner side part 250' and the outer side part 230' in the design of the battery module to limit the width of the cell assembly 100 in the event of swelling phenomena.

To this end, the protrusion height of the protruding part 212' may be the preset distance.

The protruding part 212' may be formed on a surface facing the first outer side part 230a' at the central part of the first inner side part 250a' and a surface facing the second outer side part 230b' at the central part of the second inner side part 250b'.

Additionally, the protruding part 212' may be in the shape of a plate with a predetermined width to apply the pressure applied to the first inner side part 250a' and the second inner side part 250b' with the volume increase of the cell assembly 100 over the wide area of the first outer side part 230a' and the second outer side part 230b' respectively.

Through this, the protruding part 212' keeps the inner side part 250' and the outer side part 230' apart at the preset distance to prevent the inner side part 250' from deforming and bending too much.

Hereinafter, the guide groove part according to another embodiment of the present disclosure will be described.

Figure 11:
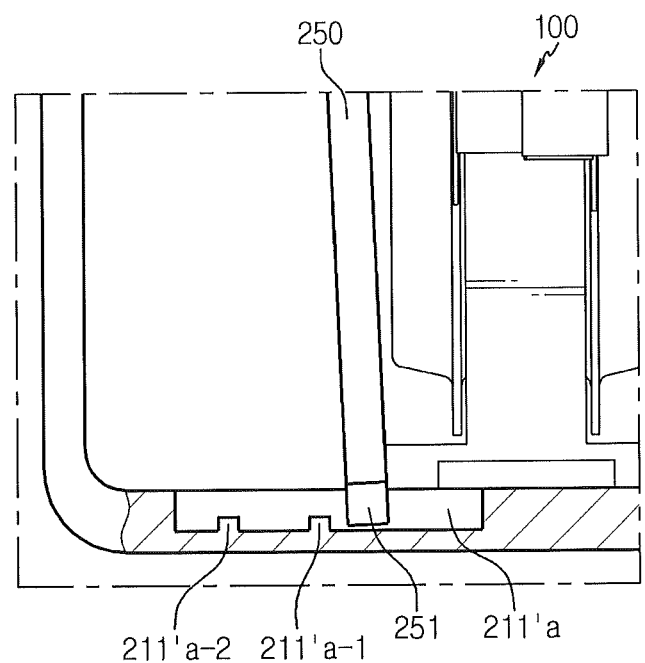
FIG. 11 is an enlarged view of a guide groove part according to another embodiment of the present disclosure.

FIG. 11 is an enlarged view of the guide groove part according to another embodiment of the present disclosure.

Referring to FIG. 11, the guide groove part 211'a according to another embodiment is substantially identical or similar to the above-described guide groove part 211 according to an embodiment of the present disclosure, and thus the identical or similar elements are not repeatedly described and difference(s) will be described.

The guide groove part 211'a according to another embodiment of the present disclosure may have guide protrusion part 211'a-1, 211'a-2 that protrudes along the movement direction of the stop protrusion part 251 on the upper surface.

The guide protrusion part 211'a-1, 211'a-2 may stepwise limit the movement of the stop protrusion part 251 caused by the volume increase of the cell assembly 100. To this end, the guide protrusion part 211'a-1, 211'a-2 may include a first guide protrusion part 211'a-1 positioned close to the cell assembly 100, and a second guide protrusion part 211'a-2 positioned further from the cell assembly 100 than the first guide protrusion part 211'a-1.

More specifically, the first guide protrusion part 211'a-1 may come into contact with the stop protrusion part 251 earlier than the second guide protrusion part 211'a-2 and primarily limit the movement of the stop protrusion part 251. Through this, the first guide protrusion part 211'a-1 may increase the elasticity of the inner side part 250 connected to the stop protrusion part 251.

Subsequently, when the pressure applied to the inner side part 250 increases with the further increasing volume of the cell assembly 100, the stop protrusion part 251 may go over the first guide protrusion part 211'a-1. Accordingly, the second guide protrusion part 211'a-2 may secondarily limit the movement of the stop protrusion part 251 going over the first guide protrusion part 211'a-1.

Through this, the guide protrusion part 211'a-1, 211'a-2 may stepwise limit the movement of the stop protrusion part 250, thereby stepwise limiting the shape changes of the cell assembly 100 that is supported by the inner side part 251.

Meanwhile, although the foregoing description presents two guide protrusion parts 211'a-1, 211'a-2 formed in the guide groove part 211'a, there is no limitation on the number of guide protrusion parts 211'a-1, 211'a-2 formed in the guide groove part 211'a to limit the movement of the stop protrusion part 251 caused by the volume increase of the cell assembly 100.

Additionally, although FIG. 11 shows that the guide protrusion part 211'a-1, 211'a-2 is in a rectangular shape, the guide protrusion part may have a shape with a slope surface tilted in response to the movement direction of the stop protrusion part 251.

Hereinafter, a guide groove part according to still another embodiment of the present disclosure will be described.

Figure 12:
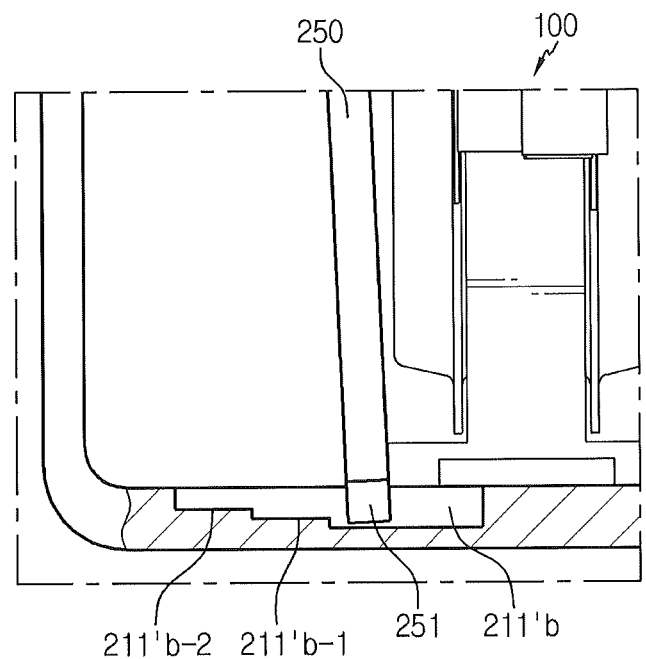
FIG. 12 is an enlarged view of a guide groove part according to still another embodiment of the present disclosure.

FIG. 12 is an enlarged view of the guide groove part according to still another embodiment of the present disclosure.

Referring to FIG. 12, the guide groove part 211'b according to still another embodiment is substantially identical or similar to the previously described guide groove part 211 according to an embodiment of the present disclosure, and thus the identical or similar elements are not repeatedly described and difference(s) will be described.

The guide groove part 211'b according to still another embodiment of the present disclosure may have guide step part 211'b-1, 211'b-2 with step along the movement direction of the stop protrusion part 251 on the upper surface.

The guide step part 211'b-1, 211'b-2 may stepwise limit the movement of the stop protrusion part 251 caused by the volume increase of the cell assembly 100. Additionally, the guide step part 211'b-1, 211'b-2 is formed higher than the guide groove part 211'b to further bend the inner side part 250, thereby increasing the elasticity applied to the cell assembly 100 from the inner side part 250.

More specifically, the guide step part 211'b-1, 211'b-2 may include a first guide step part 211'b-1 that is closer to the cell assembly 100 and is formed higher than the guide groove part 211'b, and a second guide step part 211'b-2 that is positioned further from the cell assembly 100 than the first guide step part 211'b-1 and is formed higher than the first guide step part 211'b-1.

The first guide step part 211'b-1 bends the inner side part 250 more than when the stop protrusion part 251 is positioned at the guide groove part 211'b, allowing the inner side part 250 to apply the increased elasticity to the cell assembly 100.

Subsequently, when the pressure applied to the inner side part 250 increases with the further increasing volume of the cell assembly 100, the stop protrusion part 251 may move to the second guide step part 211'b-2 via the first guide step part 211'b-1.

In this instance, as the stop protrusion part 251 moves up due to the height of the second guide step part 211'b-2, the inner side part 250 is bent more than when the stop protrusion part 251 is positioned at the first guide step part 211'b-1, and may apply the increased elasticity to the cell assembly 100.

That is, when the volume of the cell assembly 100 increases due to swelling, the stop protrusion part 251 moves in an order of the first guide step part 211'b-1 and the second guide step part 211'b-2, and accordingly, the inner side part 250 may apply elasticity to the cell assembly 100 in response to the increased volume of the cell assembly 100, thereby preventing the shape changes of the cell assembly 100.

The battery pack according to the present disclosure may include at least one battery module according to the present disclosure.

Figure 13:
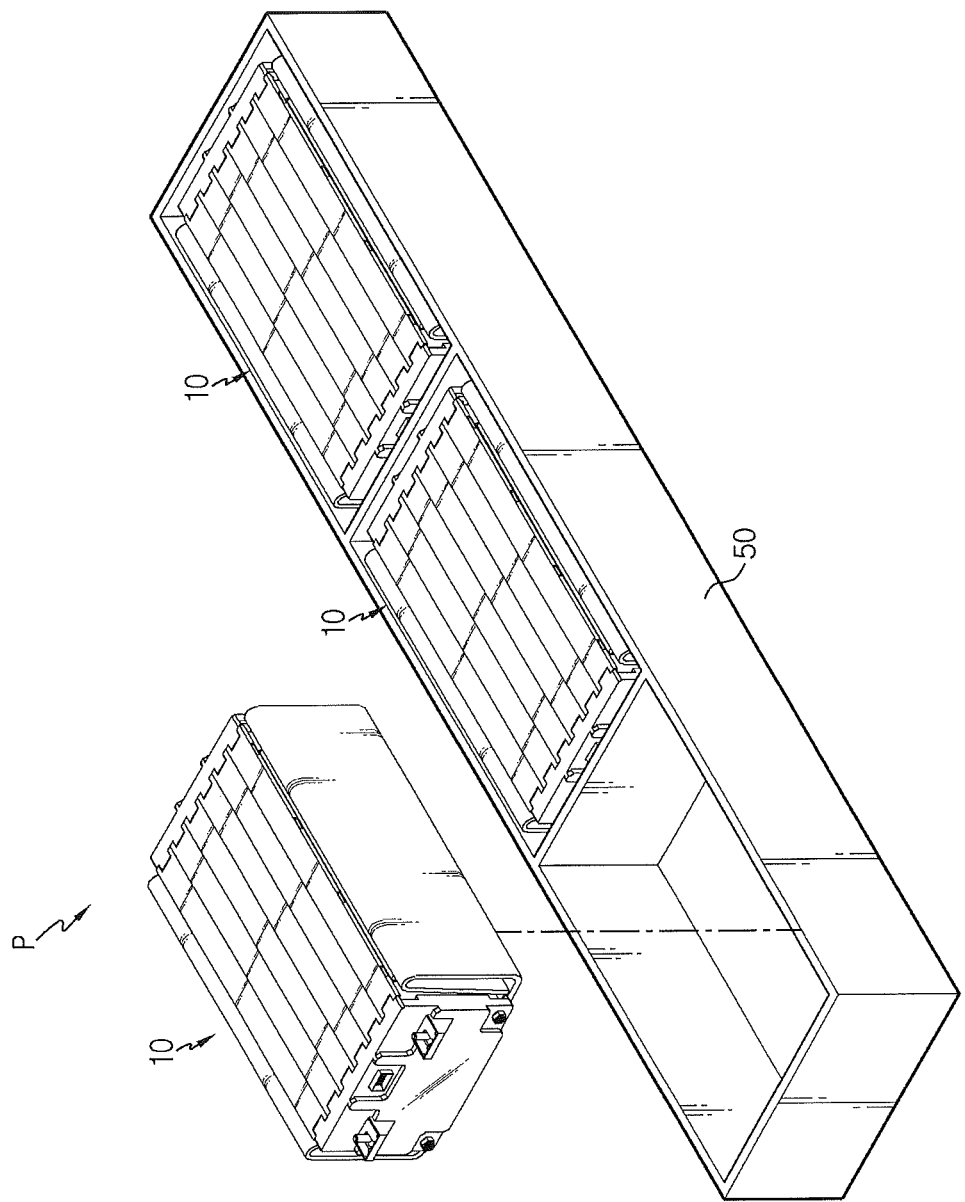
FIG. 13 is a schematic diagram of a battery pack according to an embodiment of the present disclosure.

FIG. 13 is a schematic diagram of the battery pack according to an embodiment of the present disclosure.

Referring to FIG. 13, the battery pack P may include at least one battery module 10 according to the previous embodiment and a pack case 50 to package the at least one battery module 10.

For example, the battery pack P according to the present disclosure may have three battery modules 10 received in the pack case 50 as shown in the drawing.

In addition to the battery module 10, the battery pack P according to the present disclosure may further include the pack case 50 to receive the battery module 10, and various types of devices to control the charge/discharge of the battery module, for example, a Battery Management System (BMS), a current sensor, a fuse, and the like. The battery pack P may be provided in vehicles as a driving source of the vehicles. For example, the battery pack P may be provided in vehicles that are driven using the battery pack P, such as electric vehicles and hybrid electric vehicles. Additionally, it is obvious that the battery pack P may be provided in vehicles as well as other devices, apparatus and equipment such as energy storage systems or battery charging systems using secondary batteries.

As described above, because the battery pack P according to this embodiment and a device, apparatus and equipment including the battery pack P, such as a vehicle include the above-described battery module 10, it is possible to realize the battery pack P and the vehicle having an advantage from the above-described battery module 10.

The present disclosure is not limited to the above-described embodiments and the accompanying drawings, and various substitutions, modifications and changes may be made thereto by those skilled in the art without departing from the technical aspects of the present disclosure.

What is claimed is:

1. A battery module comprising:
a cell assembly including a plurality of battery cells stacked side by side in a horizontal direction, each battery cell defining a respective plane extending in a vertical direction perpendicular to the horizontal direction; and
an end plate having a support part configured to support a bottom of the cell assembly, an outer side part extending in the vertical direction from an end of the support part, and an inner side part extending downward and inward from a top of the outer side part, the inner side part having a bottom that is remote from the top of the outer side part,
wherein the bottom of the inner side part is slidable in the horizontal direction between a first position and a second position, the second position being closer to the outer side part than the first position, the end plate being configured such that the bottom of the inner side part moves from the first position to the second position when the cell assembly expands in the horizontal direction, and
wherein the inner side part includes a stop protrusion part at the bottom of the inner side part, the stop protrusion part extending downward from a remainder of the inner side part, and
the support part includes a guide groove part into which the stop protrusion part of the inner side part extends, the guide groove part being a groove in the support part that extends in the horizontal direction between a first end and a second end that are configured to limit movement of the inner side part in the horizontal direction.

2. The battery module according to claim 1, wherein the inner side part includes a first inner side part and a second inner side part, and
a distance between a bottom of the first inner side part and a bottom of the second inner side part is less than a width of the cell assembly in the horizontal direction.

3. The battery module according to claim 2, wherein a distance between a top of the first inner side part and a top of the second inner side part is equal to or larger than a width of the cell assembly in the horizontal direction.

4. The battery module according to claim 1, wherein the support part, the outer side part and the inner side part are integrally formed.

5. The battery module according to claim 1, wherein the inner side part extends from the top of the outer side part at an acute angle.

6. The battery module according to claim 1, wherein the inner side part includes a protruding part that extends in the horizontal direction toward the outer side part, the protruding part being configured to limit the movement of the inner side part to a preset distance in the horizontal direction.

7. An end plate comprising:
a support part configured to support a bottom of a cell assembly including a plurality of battery cells stacked side by side in a horizontal direction, each battery cell defining a respective plane extending in a vertical direction perpendicular to the horizontal direction;
an outer side part extending in the vertical direction from an end of the support part; and
an inner side part extending downward and inward from a top of the outer side part, the inner side part having a bottom that is remote from the top of the outer side part,
wherein the bottom of the inner side part is slidable in the horizontal direction between a first position and a second position, the second position being closer to the outer side part than the first position, the end plate being configured such that the bottom of the inner side part moves from the first position to the second position when the cell assembly expands in the horizontal direction, and
wherein the inner side part includes a stop protrusion part at the bottom of the inner side part, the stop protrusion part extending downward from a remainder of the inner side part, and
the support part includes a guide groove part into which the stop protrusion part of the inner side part extends, the guide groove part being a groove in the support part that extends in the horizontal direction between a first end and a second end that are configured to limit movement of the inner side part in the horizontal direction.

8. A battery pack comprising:
the battery module according to claim 1; and
a pack case configured to receive the battery module therein.

9. A vehicle comprising:
the battery pack according to claim 8.

* * * * *